United States Patent
Moorman et al.

(10) Patent No.: US 8,740,748 B2
(45) Date of Patent: *Jun. 3, 2014

(54) CONTROL SYSTEM AND METHOD FOR A DUAL CLUTCH TRANSMISSION

(75) Inventors: Steven P. Moorman, Dexter, MI (US); Philip C. Lundberg, Keego Harbor, MI (US); John R. Czoykowski, Grosse Pointe Park, MI (US); Bret M. Olson, Whitelake, MI (US); Christopher Jay Weingartz, Holly, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 302 days.

This patent is subject to a terminal disclaimer.

(21) Appl. No.: 13/269,744

(22) Filed: Oct. 10, 2011

(65) Prior Publication Data
US 2012/0145504 A1  Jun. 14, 2012

Related U.S. Application Data

(60) Provisional application No. 61/421,136, filed on Dec. 8, 2010.

(51) Int. Cl.
*B60W 10/02* (2006.01)
*B60W 10/04* (2006.01)
*B60W 10/10* (2012.01)

(52) U.S. Cl.
USPC ............ 477/174; 477/180; 701/58; 701/68; 192/3.58; 192/48.601

(58) Field of Classification Search
None
See application file for complete search history.

(56) References Cited

U.S. PATENT DOCUMENTS

| | | | |
|---|---|---|---|
| 3,774,475 A | 11/1973 | Meysenburg et al. | |
| 3,834,499 A | 9/1974 | Candellero et al. | |
| 4,589,295 A | 5/1986 | Jerry et al. | |
| 4,653,352 A | 3/1987 | Nakao et al. | |
| 4,944,202 A | 7/1990 | Gierer | |
| 5,240,093 A * | 8/1993 | Wagner et al. ............... | 192/3.58 |
| 5,441,459 A | 8/1995 | Inukai et al. | |
| 5,813,940 A | 9/1998 | Ramm et al. | |
| 5,950,781 A | 9/1999 | Adamis et al. | |
| 6,675,668 B2 | 1/2004 | Schamscha | |
| 6,698,304 B2 | 3/2004 | Gierling et al. | |
| 6,715,597 B1 | 4/2004 | Buchanan et al. | |
| 6,789,658 B2 | 9/2004 | Busold et al. | |
| 6,827,191 B2 | 12/2004 | Kuhstrebe | |
| 6,883,394 B2 | 4/2005 | Koenig et al. | |
| 6,941,830 B2 | 9/2005 | Ibamoto et al. | |

(Continued)

FOREIGN PATENT DOCUMENTS

| | | |
|---|---|---|
| DE | 2141564 A1 | 2/1973 |
| DE | 4117736 C1 | 5/1992 |

(Continued)

*Primary Examiner* — Richard M. Lorence

(57) ABSTRACT

A hydraulic control system and method for controlling a dual clutch transmission includes a plurality of pressure and flow control devices and logic valve assemblies in fluid communication with a plurality of clutch actuators and with a plurality of synchronizer actuators. The clutch actuators are operable to actuate a plurality of torque transmitting devices and the synchronizer actuators are operable to actuate a plurality of synchronizer assemblies. Selective activation of combinations of the pressure control solenoids and the flow control solenoids allows for a pressurized fluid to activate at least one of the clutch actuators and synchronizer actuators in order to shift the transmission into a desired gear ratio.

17 Claims, 7 Drawing Sheets

(56) References Cited

U.S. PATENT DOCUMENTS

| | | |
|---|---|---|
| 7,044,013 B2 | 5/2006 | Ahrens |
| 7,048,672 B2 | 5/2006 | Bothe et al. |
| 7,300,375 B2 | 11/2007 | Petrzik |
| 7,401,689 B2 | 7/2008 | Hegerath et al. |
| 7,464,617 B2 | 12/2008 | Baldascini et al. |
| 7,464,618 B2 | 12/2008 | Mohlmann et al. |
| 7,472,616 B2 | 1/2009 | Dreher et al. |
| 7,478,572 B2 | 1/2009 | Maten et al. |
| 7,487,866 B2 | 2/2009 | Kruse et al. |
| 7,575,533 B2 | 8/2009 | Gumpoltsberger |
| 7,591,203 B2 | 9/2009 | Ochi et al. |
| 7,608,008 B2 | 10/2009 | Seo |
| 7,621,840 B2 | 11/2009 | Kamm et al. |
| 2001/0036878 A1 | 11/2001 | Itou et al. |
| 2002/0060113 A1 | 5/2002 | Harries |
| 2002/0119864 A1 | 8/2002 | Harries |
| 2003/0075408 A1 | 4/2003 | Alfredsson |
| 2003/0226416 A1 | 12/2003 | Umemoto et al. |
| 2004/0038765 A1 | 2/2004 | Fujimine et al. |
| 2005/0067251 A1 | 3/2005 | Braford et al. |
| 2005/0107214 A1 | 5/2005 | Koenig |
| 2005/0272559 A1 | 12/2005 | Bothe et al. |
| 2007/0175726 A1 | 8/2007 | Combes et al. |
| 2008/0108472 A1 | 5/2008 | Seo |
| 2008/0108474 A1 | 5/2008 | Seo |
| 2008/0207392 A1 | 8/2008 | Staudinger et al. |
| 2008/0210032 A1 | 9/2008 | Uberti et al. |
| 2008/0223683 A1 | 9/2008 | Grethel |
| 2008/0234093 A1 | 9/2008 | Diosi et al. |
| 2008/0242493 A1 | 10/2008 | Carey et al. |
| 2008/0305911 A1 | 12/2008 | Moorman et al. |
| 2009/0000897 A1 | 1/2009 | Staudinger et al. |
| 2009/0017963 A1 | 1/2009 | Hart et al. |
| 2009/0048061 A1 | 2/2009 | Hart et al. |
| 2009/0151495 A1 | 6/2009 | Garabello et al. |
| 2009/0157271 A1 | 6/2009 | Garabello et al. |
| 2009/0221394 A1 | 9/2009 | Phillips et al. |
| 2009/0247351 A1 | 10/2009 | Seo et al. |
| 2011/0180364 A1 | 7/2011 | Czoykowski et al. |
| 2012/0145502 A1* | 6/2012 | Moorman et al. ............ 192/3.58 |
| 2012/0145503 A1* | 6/2012 | Moorman et al. ............ 192/3.58 |

FOREIGN PATENT DOCUMENTS

| | | |
|---|---|---|
| DE | 4320353 A1 | 1/1994 |
| DE | 29714652 U1 | 10/1997 |
| DE | 19921301 A1 | 11/1999 |
| DE | 19849488 A1 | 5/2000 |
| DE | 19931973 A1 | 1/2001 |
| DE | 10125172 A1 | 11/2002 |
| DE | 10134115 A1 | 1/2003 |
| DE | 10243282 A1 | 4/2004 |
| DE | 102005029963 A1 | 2/2007 |
| DE | 102005029964 A1 | 3/2007 |
| DE | 102005050479 A1 | 5/2007 |
| DE | 102006005858 A1 | 8/2007 |
| DE | 102008008454 A1 | 9/2008 |
| DE | 102008058692 A1 | 6/2009 |
| EP | 1400733 A2 | 3/2004 |
| EP | 1433976 A1 | 6/2004 |
| EP | 1469235 A1 | 10/2004 |
| EP | 1519082 A1 | 3/2005 |
| EP | 1589262 A1 | 10/2005 |
| EP | 1645786 A2 | 4/2006 |
| EP | 1767824 A1 | 3/2007 |
| EP | 2151586 A2 | 2/2010 |
| FR | 2808065 A1 | 10/2001 |
| JP | 58102851 A | 8/1983 |
| JP | 2007010145 A | 1/2007 |
| WO | WO9919644 A1 | 4/1999 |
| WO | WO2004015302 A1 | 2/2004 |
| WO | WO2004076225 A1 | 9/2004 |
| WO | WO2004097265 A1 | 11/2004 |
| WO | WO2005078319 A1 | 8/2005 |
| WO | WO2006094711 A1 | 9/2006 |
| WO | WO2007017012 A1 | 2/2007 |
| WO | WO2009037170 A1 | 3/2009 |
| WO | WO2010028745 A2 | 3/2010 |

* cited by examiner

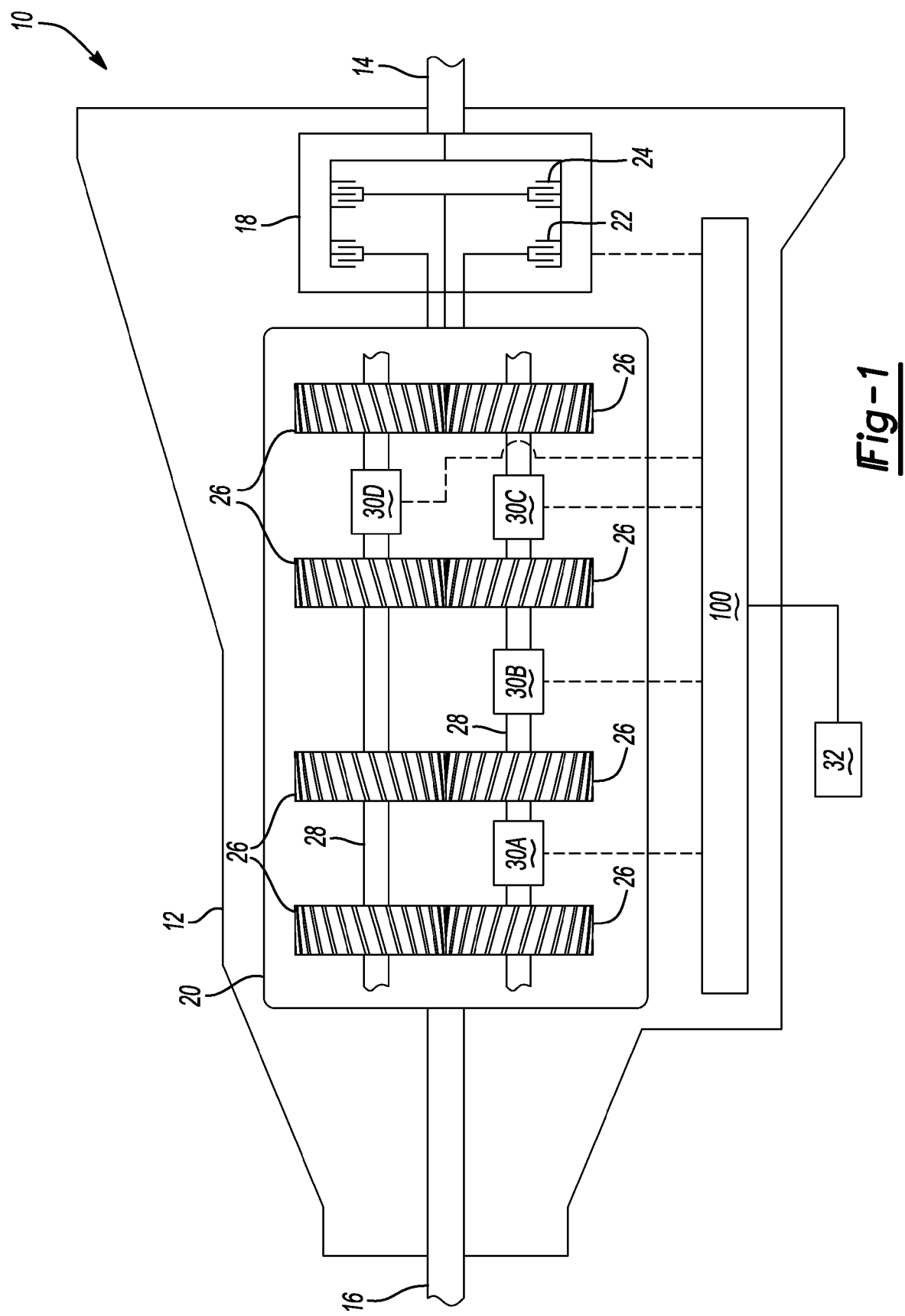

CONTROL SYSTEM AND METHOD FOR A DUAL CLUTCH TRANSMISSION

CROSS-REFERENCE

This application claims the benefit of U.S. Provisional Application No. 61/421,136, filed Dec. 8, 2010. The entire contents of the above application are incorporated herein by reference.

TECHNICAL FIELD

The invention relates to a control system and method for a dual clutch transmission, and more particularly to an electro-hydraulic control system and method having a plurality of solenoids and valves operable to actuate a plurality of actuators within the dual clutch transmission.

BACKGROUND

A typical multi-speed, dual clutch transmission uses a combination of two friction clutches and several dog clutch/synchronizers to achieve "power-on" or dynamic shifts by alternating between one friction clutch and the other, with the synchronizers being "pre-selected" for the oncoming ratio prior to actually making the dynamic shift. "Power-on" shifting means that torque flow from the engine need not be interrupted prior to making the shift. This concept typically uses countershaft gears with a different, dedicated gear pair or set to achieve each forward speed ratio. Typically an electronically controlled hydraulic control circuit or system is employed to control solenoids and valve assemblies. The solenoid and valve assemblies actuate clutches and synchronizers to achieve the forward and reverse gear ratios.

While previous hydraulic control systems are useful for their intended purpose, the need for new and improved hydraulic control system configurations within transmissions which exhibit improved performance, especially from the standpoints of efficiency, responsiveness and smoothness, is essentially constant. Accordingly, there is a need for an improved, cost-effective hydraulic control system for use in a dual clutch transmission.

SUMMARY

A method for controlling a hydraulic control system is provided. The hydraulic control system includes a plurality of pressure and flow control devices and logic valves in fluid communication with a plurality of clutch actuators and with a plurality of synchronizer actuators. The clutch actuators are operable to actuate a plurality of torque transmitting devices and the synchronizer actuators are operable to actuate a plurality of synchronizer assemblies. Selective activation of combinations of the pressure control solenoids and the flow control solenoids allows for a pressurized fluid to activate at least one of the clutch actuators and synchronizer actuators in order to shift the transmission into a desired gear ratio.

In one example of the hydraulic control system, the hydraulic control system includes an electric pump and an accumulator that provide a pressurized hydraulic fluid.

In another example of the hydraulic control system, the hydraulic control system includes two pressure control devices and two flow control devices used to actuate the dual clutch.

In yet another example of the hydraulic control system, the hydraulic control system includes two pressure control devices, two flow control devices, and two logic valves and a logic valve control solenoid used to actuate the plurality of synchronizer assemblies.

Further features, aspects and advantages of the present invention will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

FIG. 1 is a schematic diagram of an exemplary dual clutch transmission having a hydraulic control system according to the principles of the present invention;

DESCRIPTION

Figure 2A:
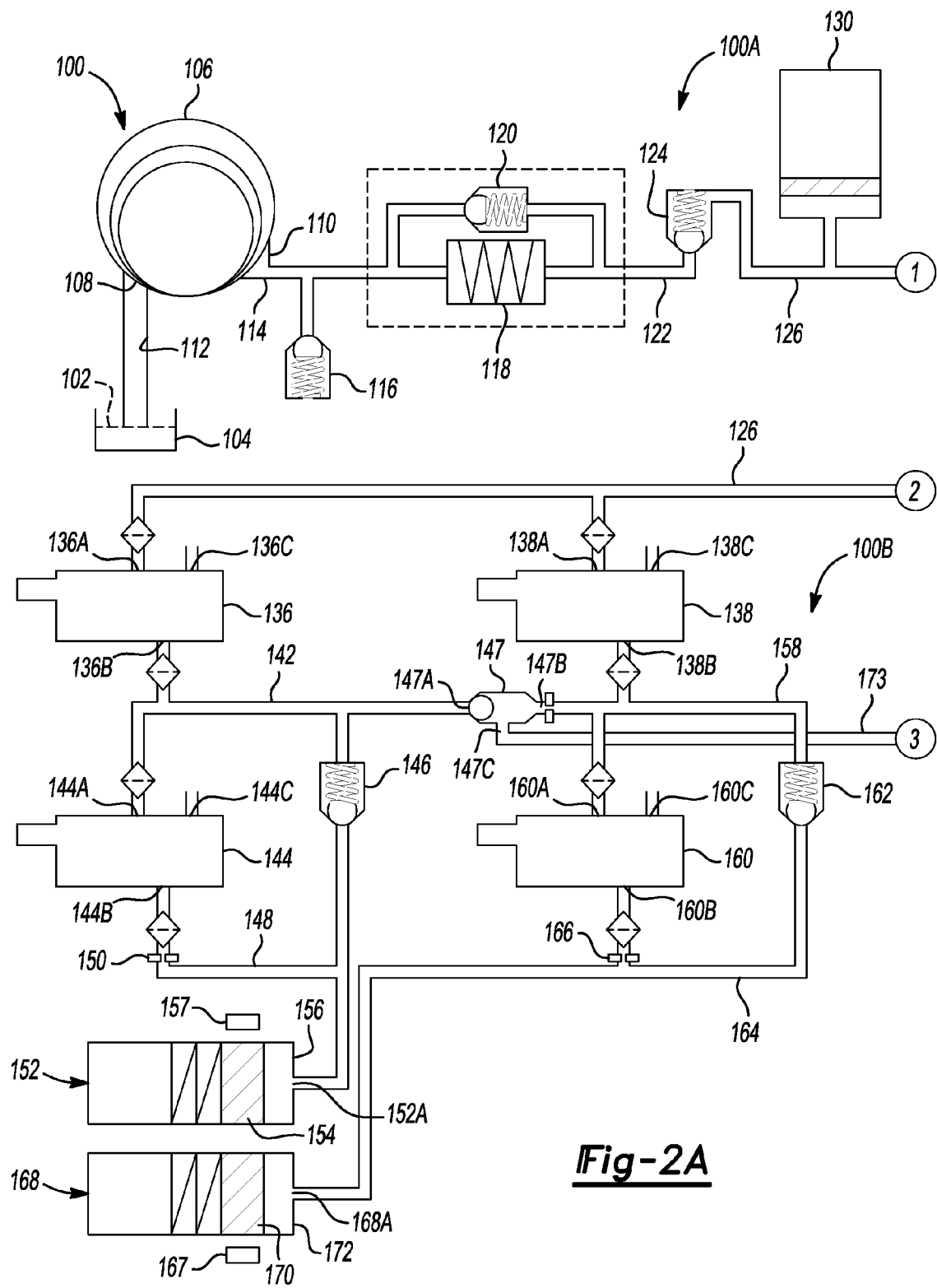
FIGS. 2A-B are schematic diagrams of an embodiment of a hydraulic control system for a dual clutch transmission according to the principles of the present invention.

With reference to FIG. 1, an exemplary dual clutch automatic transmission incorporating the present invention is illustrated and generally designated by the reference number 10. The dual clutch transmission 10 includes a typically cast, metal housing 12 which encloses and protects the various components of the transmission 10. The housing 12 includes a variety of apertures, passageways, shoulders and flanges which position and support these components. While the housing 12 is illustrated as a typical rear wheel drive transmission, it should be appreciated that the transmission 10 may be a front wheel drive transmission or a rear wheel drive transmission without departing from the scope of the present invention. The transmission 10 includes an input shaft 14, an output shaft 16, a dual clutch assembly 18, and a gear arrangement 20. The input shaft 14 is connected with a prime mover (not shown) such as an internal combustion gas or Diesel engine or a hybrid power plant. The input shaft 14 receives input torque or power from the prime mover. The output shaft 16 is preferably connected with a final drive unit (not shown) which may include, for example, propshafts, differential assemblies, and drive axles. The input shaft 14 is coupled to and drives the dual clutch assembly 18. The dual clutch assembly 18 preferably includes a pair of selectively engageable torque transmitting devices including a first torque transmitting device 22 and a second torque transmitting device 24. The torque transmitting devices 22, 24 are preferably dry clutches. The torque transmitting devices 22, 24 are mutually exclusively engaged to provide drive torque to the gear arrangement 20.

The gear arrangement 20 includes a plurality of gear sets, indicated generally by reference number 26, and a plurality of shafts, indicated generally by reference number 28. The plurality of gear sets 26 includes individual intermeshing gears that are connected to or selectively connectable to the plurality of shafts 28. The plurality of shafts 28 may include layshafts, countershafts, sleeve and center shafts, reverse or idle shafts, or combinations thereof. It should be appreciated that the specific arrangement and number of the gear sets 26 and the specific arrangement and number of the shafts 28 within the transmission 10 may vary without departing from the scope of the present invention. In the example provided, the transmission 10 provides seven forward gears and a reverse gear.

The gear arrangement 20 further includes a first synchronizer assembly 30A, a second synchronizer assembly 30B, a third synchronizer assembly 30C, and a fourth synchronizer assembly 30D. The synchronizer assemblies 30A-D are operable to selectively couple individual gears within the plurality of gear sets 26 to the plurality of shafts 28. Each synchronizer assembly 30A-D is disposed either adjacent certain single gears or between adjacent pairs of gears within adjacent gear sets 26. Each synchronizer assembly 30A-D, when activated, synchronizes the speed of a gear to that of a shaft and a positive clutch, such as a dog or face clutch. The synchronizer positively connects or couples the gear to the shaft. The synchronizer actuator is bi-directionally translated by a shift rail and fork assembly (not shown) within each synchronizer assembly 30A-D.

The transmission also includes a transmission control module 32. The transmission control module 32 is preferably an electronic control device having a preprogrammed digital computer or processor, control logic, memory used to store data, and at least one I/O peripheral. The control logic includes a plurality of logic routines for monitoring, manipulating, and generating data. The transmission control module 32 controls the actuation of the dual clutch assembly 18 and the synchronizer assemblies 30A-D via a hydraulic control system 100 according to the principles of the present invention.

Figure 2B:
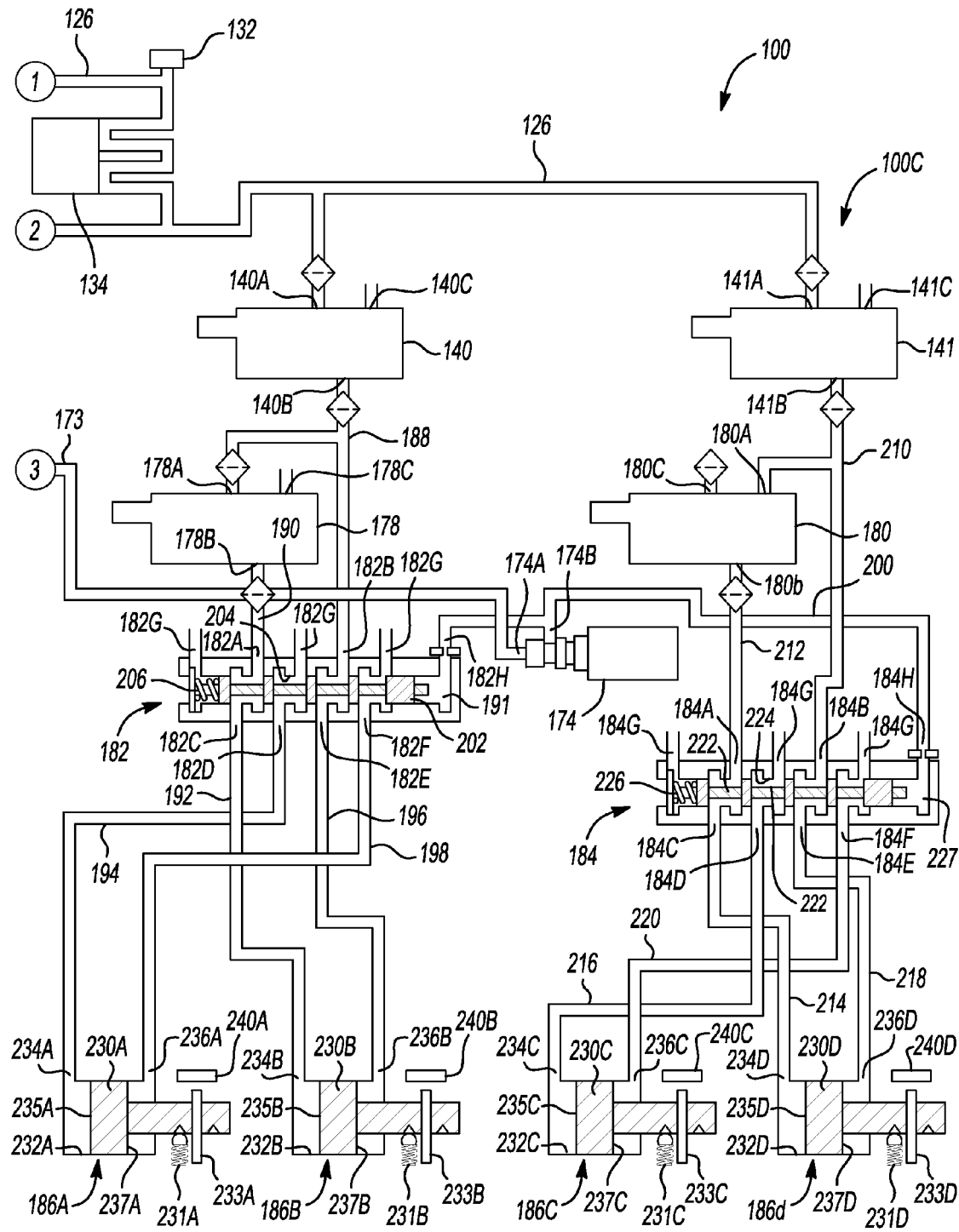

Turning to FIGS. 2A-B, the hydraulic control system 100 generally includes three subsystems: an oil or hydraulic fluid delivery subsystem 100A, a clutch actuator subsystem 100B, and a synchronizer actuator subsystem 100C. The hydraulic control system 100 is operable to selectively engage the dual clutch assembly 18 and the synchronizer assemblies 30A-D by selectively communicating a hydraulic fluid 102 from a sump 104 to a plurality of shift actuating devices, as will be described in greater detail below. The sump 104 is a tank or reservoir to which the hydraulic fluid 102 returns and collects from various components and regions of the automatic transmission 10. The hydraulic fluid 102 is forced from the sump 104 via a pump 106. The pump 106 is driven by an electric motor or combustion engine (not shown) or any other type of prime mover. The pump 106 may be, for example, a gear pump, a vane pump, a gerotor pump, or any other positive displacement pump. The pump 106 includes an inlet port 108 and an outlet port 110. The inlet port 108 communicates with the sump 104 via a suction line 112. The outlet port 110 communicates pressurized hydraulic fluid 102 to a supply line 114. The supply line 114 is in communication with a spring biased blow-off safety valve 116, a pressure side filter 118, and a spring biased check valve 120. The spring biased blow-off safety valve 116 communicates with the sump 104. The spring biased blow-off safety valve 116 is set at a relatively high predetermined pressure and if the pressure of the hydraulic fluid 102 in the supply line 114 exceeds this pressure, the safety valve 116 opens momentarily to relieve and reduce the pressure of the hydraulic fluid 102. The pressure side filter 118 is disposed in parallel with the spring biased check valve 120. If the pressure side filter 118 becomes blocked or partially blocked, pressure within supply line 114 increases and opens the spring biased check valve 120 in order to allow the hydraulic fluid 102 to bypass the pressure side filter 118.

The pressure side filter 118 and the spring biased check valve 120 each communicate with an outlet line 122. The outlet line 122 is in communication with a second check valve 124. The second check valve 124 is in communication with a main supply line 126 and is configured to maintain hydraulic pressure within the main supply line 126. The main supply line 126 supplies pressurized hydraulic fluid to an accumulator 130 and a main pressure sensor 132. The accumulator 130 is an energy storage device in which the non-compressible hydraulic fluid 102 is held under pressure by an external source. In the example provided, the accumulator 130 is a spring type or gas filled type accumulator having a spring or compressible gas that provides a compressive force on the hydraulic fluid 102 within the accumulator 130. However, it should be appreciated that the accumulator 130 may be of other types, such as a gas-charged type, without departing from the scope of the present invention. Accordingly, the accumulator 130 is operable to supply pressurized hydraulic fluid 102 back to the main supply line 126. However, upon discharge of the accumulator 130, the second check valve 124 prevents the pressurized hydraulic fluid 102 from returning to the pump 106. The accumulator 130, when charged, effectively replaces the pump 106 as the source of pressurized hydraulic fluid 102, thereby eliminating the need for the pump 106 to run continuously. The main pressure sensor 132 reads the pressure of the hydraulic fluid 102 within the main supply line 126 in real time and provides this data to the transmission control module 32. Accordingly, the transmission control module 32 can operate the pump 106 based on real-time conditions of the accumulator 130.

The main supply line 126 is channeled through a heat sink 134 used to cool the controller 32, though it should be appreciated that the heat sink 134 may be located elsewhere or removed from the hydraulic control system 100 without departing from the scope of the present invention. The main supply line 126 supplies pressurized hydraulic fluid 102 to four pressure control devices including a first clutch pressure control device 136, a second clutch pressure control device 138, and a first actuator pressure control device 140, and a second actuator pressure control device 141.

The first clutch pressure control device 136 is preferably an electrically controlled variable force solenoid having an internal closed loop pressure control. Various makes, types, and models of solenoids may be employed with the present invention so long as the first clutch pressure control device 136 is operable to control the pressure of the hydraulic fluid 102. The first clutch pressure control device 136 includes an inlet port 136A that communicates with an outlet port 136B when the first clutch pressure control device 136 is activated or energized and includes an exhaust port 136C that communicates with the outlet port 136B when the first clutch pressure control device 136 is inactive or de-energized. Variable activation of the first clutch pressure control device 136 regulates or controls the pressure of the hydraulic fluid 102 as the hydraulic fluid 102 communicates from the inlet port 136A to the outlet port 136B. The internal closed loop pressure control provides pressure feedback within the solenoid to adjust the amount of flow to the outlet port 136B based on a particular current command from the controller 32, thereby controlling pressure. The inlet port 136A is in communication with the main supply line 126. The outlet port 136B is in communication with an intermediate line 142. The exhaust port 136C is in communication with the sump 104 or an exhaust backfill circuit (not shown).

The intermediate line 142 communicates the hydraulic fluid 102 from the first clutch pressure control device 136 to a first clutch flow control device 144, to a first pressure limit control valve 146, and a three way ball check valve 147. The first clutch flow control device 144 is preferably an electrically controlled variable force solenoid that is operable to control a flow of the hydraulic fluid 102 from the first clutch flow control device 144 in order to actuate the first torque transmitting device 22, as will be described in greater detail below. The first clutch flow control device 144 includes an inlet port 144A that communicates with an outlet port 144B when the first clutch flow control device 144 is energized to a current greater than a null point current (i.e., the zero forward/reverse flow point for the given current) and includes an exhaust port 144C that communicates with the outlet port 144B when the first clutch flow control device 144 is de-energized to a current less than the null point current. Variable activation of the first clutch flow control device 144 regulates or controls the flow of the hydraulic fluid 102 as the hydraulic fluid 102 communicates from the inlet port 144A to the outlet port 144B. The inlet port 144A is in communication with the intermediate line 142. The outlet port 144B is in communication with a first clutch supply line 148 and a flow restriction orifice 150. The exhaust port 144C is in communication with the sump 104 or an exhaust backfill circuit (not shown). The first pressure limit control valve 146 is disposed in parallel with the first clutch flow control solenoid 144 and is in communication with the first clutch supply line 148. If pressure within the first clutch supply line 148 exceeds a predetermined value, the first pressure limit control valve 146 opens to relieve and reduce the pressure.

The first clutch supply line 148 is in fluid communication with an inlet/outlet port 152A in a first clutch piston assembly 152. The first clutch piston assembly 152 includes a single acting piston 154 slidably disposed in a cylinder 156. The piston 154 translates under hydraulic pressure to engage the first torque transmitting device 22, shown in FIG. 1. When the first clutch flow control device 144 is activated or energized, a flow of pressurized hydraulic fluid 102 is provided to the first clutch supply line 148. The flow of pressurized hydraulic fluid 102 is communicated from the first clutch supply line 148 to the first clutch piston assembly 152 where the pressurized hydraulic fluid 102 translates the piston 154, thereby engaging the first torque transmitting device 22. When the first clutch flow control solenoid 144 is de-energized, the inlet port 144A is closed and hydraulic fluid from the cylinder 156 passes from the outlet port 144B to the exhaust port 144C and into the sump 104 or an exhaust backfill circuit (not shown), thereby disengaging the first torque transmitting device 22. The translation of the piston 154 is monitored by a position sensor 157.

The second clutch pressure control device 138 is preferably an electrically controlled variable force solenoid having an internal closed loop pressure control. Various makes, types, and models of solenoids may be employed with the present invention so long as the second clutch pressure control device 138 is operable to control the pressure of the hydraulic fluid 102. The second clutch pressure control device 138 includes an inlet port 138A that communicates with an outlet port 138B when the second clutch pressure control device 138 is activated or energized and includes an exhaust port 138C that communicates with the outlet port 138B when the second clutch pressure control device 138 is inactive or de-energized. Variable activation of the second clutch pressure control device 138 regulates or controls the pressure of the hydraulic fluid 102 as the hydraulic fluid 102 communicates from the inlet port 138A to the outlet port 138B. The internal closed loop pressure control provides pressure feedback within the solenoid to adjust the amount of flow to the outlet port 138B based on a particular current command from the controller 32, thereby controlling pressure. The inlet port 138A is in communication with the main supply line 126. The outlet port 138B is in communication with an intermediate line 158. The exhaust port 138C is in communication with the sump 104 or an exhaust backfill circuit (not shown).

The intermediate line 158 communicates the hydraulic fluid 102 from the second clutch pressure control device 138 to a second clutch flow control device 160, to a second pressure limit control valve 162, and to the three-way ball check valve 147. The second clutch flow control device 160 is preferably an electrically controlled variable force solenoid that is operable to control a flow of the hydraulic fluid 102 from the second clutch flow control device 160 in order to actuate the second torque transmitting device 24, as will be described in greater detail below. The second clutch flow control device 160 includes an inlet port 160A that communicates with an outlet port 160B when the second clutch flow control device 160 is energized to a current greater than the null point current and includes an exhaust port 160C that communicates with the outlet port 160B when the second clutch flow control device 160 is de-energized below the null point current. Variable activation of the second clutch flow control device 160 regulates or controls the flow of the hydraulic fluid 102 as the hydraulic fluid 102 communicates from the inlet port 160A to the outlet port 160B. The inlet port 160A is in communication with the intermediate line 158. The outlet port 160B is in communication with a second clutch supply line 164 and a flow restriction orifice 166. The exhaust port 160C is in communication with the sump 104 or an exhaust backfill circuit (not shown). The second pressure limit control valve 162 is disposed in parallel with the second clutch flow control solenoid 160 and is in communication with the second clutch supply line 164. If pressure within the second clutch supply line 164 exceeds a predetermined value, the second pressure limit control valve 162 opens to relieve and reduce the pressure. The translation of the piston 170 is monitored by a position sensor 167.

The second clutch supply line 164 is in fluid communication with an inlet/outlet port 168A in a second clutch piston assembly 168. The second clutch piston assembly 168 includes a single acting piston 170 slidably disposed in a cylinder 172. The piston 170 translates under hydraulic pressure to engage the second torque transmitting device 24, shown in FIG. 1. When the second clutch flow control device 160 is activated or energized, a flow of pressurized hydraulic fluid 102 is provided to the second clutch supply line 164. The flow of pressurized hydraulic fluid 102 is communicated from the second clutch supply line 164 to the second clutch piston assembly 168 where the pressurized hydraulic fluid 102 translates the piston 170, thereby engaging the second torque transmitting device 24. When the second clutch flow control solenoid 160 is de-energized, the inlet port 160A is closed and hydraulic fluid from the cylinder 172 passes from the outlet port 160B to the exhaust port 160C and into the sump 104 or an exhaust backfill circuit (not shown), thereby disengaging the second torque transmitting device 24.

The three-way ball check valve 147 includes three ports 147A, 147B, and 147C. The ball check valve 147 closes off whichever of the ports 147A and 147B that is delivering the lower hydraulic pressure and provides communication between whichever of the ports 147A and 147B having or delivering the higher hydraulic pressure with the outlet port 147C. The ports 147A and 147B each communicate with the pressure control devices 136 and 138, respectively. The outlet port 147C is in communication with a control device feed line 173. The control device feed line 173 communicates with a valve control device 174. Accordingly, activation of either clutch pressure control devices 136 and 138 provides a flow of pressurized hydraulic fluid 102 to the valve control device 174 via the control device feed line 173 without allowing a flow of pressurized hydraulic fluid 102 into the circuit of the inactivated clutch pressure control device 136, 138.

The first and second pressure control devices 140 and 141 are operable to selectively provide flows of pressurized hydraulic fluid 102 through first and second flow control devices 178, 180 and through first and second valve assemblies 182, 184 in order to selectively actuate a plurality of synchronizer shift actuators. The synchronizer actuators include a first synchronizer actuator 186A, a second synchronizer actuator 186B, a third synchronizer actuator 186C, and a fourth synchronizer actuator 186D.

For example, the first actuator pressure control device 140 is preferably an electrically controlled variable force solenoid having an internal closed loop pressure control. Various makes, types, and models of solenoids may be employed with the present invention so long as the first actuator pressure control device 140 is operable to control the pressure of the hydraulic fluid 102. The first actuator pressure control device 140 includes an inlet port 140A that communicates with an outlet port 140B when the first actuator pressure control device 140 is activated or energized and includes an exhaust port 140C that communicates with the outlet port 140B when the first actuator pressure control device 140 is inactive or de-energized. Variable activation of the first actuator pressure control device 140 regulates or controls the pressure of the hydraulic fluid 102 as the hydraulic fluid 102 communicates from the inlet port 140A to the outlet port 140B. The internal closed loop pressure control provides pressure feedback within the solenoid to adjust the amount of flow to the outlet port 140B based on a particular current command from the controller 32, thereby controlling pressure. The inlet port 140A is in communication with the main supply line 126. The outlet port 140B is in communication with an intermediate line 188. The exhaust port 140C is in communication with the sump 104 or an exhaust backfill circuit (not shown).

The intermediate line 188 communicates pressurized hydraulic fluid 102 from the first actuator pressure control device 140 to a first flow control device 178 and the first valve assembly 182. The first flow control device 178 includes an inlet port 178A that communicates through an adjustable hydraulic orifice or restriction with an outlet port 178B when the first flow control device 178 energized to a current greater than the null point current and includes an exhaust port 178C that communicates with the outlet port 178B when the first flow control device 178 is de-energized to a current less than the null point current. Variable activation of the first flow control device 178 regulates or controls the flow of the hydraulic fluid 102 as the hydraulic fluid 102 communicates from the inlet port 178A to the outlet port 178B. The inlet port 178A is in communication with the intermediate line 188. The outlet port 178B is in communication with an intermediate line 190 which communicates with the first valve assembly 182. The exhaust port 178C is in communication with the sump 104 or an exhaust backfill circuit (not shown).

The first valve assembly 182 is operable to selectively direct the pressurized hydraulic fluid 102 flows from the first pressure control device 140 and the first actuator flow control device 178 to the first synchronizer actuator 186A and to the second synchronizer actuator 186B, as will be described in greater detail below. The first valve assembly 182 includes a first inlet port 182A, a second inlet port 182B, a first outlet port 182C, a second outlet port 182D, a third outlet port 182E, a fourth outlet port 182F, a plurality of exhaust ports 182G, and a control port 182H. The first inlet port 182A is in communication with the intermediate line 190. The second inlet port 182B is in communication with the intermediate line 188. The first outlet port 182C is in communication with a synchronizer supply line 192. The second outlet port 182D is in communication with a synchronizer supply line 194. The third outlet port 182E is in communication with a synchronizer supply line 196. The fourth outlet port 182F is in communication with a synchronizer supply line 198. The exhaust ports 182G are ultimately in communication with the sump 104 or an exhaust backfill circuit (not shown). The control port 182H is in communication with a control line 200 that communicates with the control device 174.

The valve control device 174 is preferably an on-off solenoid that is normally closed. However, it should be appreciated that other types of solenoids and other control devices may be employed without departing from the scope of the present invention, such as a pressure control solenoid. For example, the valve control device 174 may be a direct acting solenoid. The valve control device 174 includes an inlet port 174A in fluid communication with the control device feed line 173 and an outlet port 174B in fluid communication with the control line 200. The valve control device 174 is electrically actuated by the controller 32 between a closed state and an open state. In the closed state, the inlet port 174A is prevented from communicating with the outlet port 174B. In the open state, the inlet port 174A is allowed to communicate with the outlet port 174B.

The first valve assembly 182 further includes a valve spool 202 slidably disposed within a valve body or bore 204. The valve spool 202 is moveable between at least two positions by a biasing member 206 and by fluid flow channeled from the control device 174 via control line 200. The biasing member 206 is preferably a spring and acts on an end of the valve spool 202 to bias the valve spool 202 to the first position or de-stroked position. When the control device 174 is energized or activated a flow of the hydraulic fluid 102 is communicated to the control port 182H via control line 200 and into a control chamber 191 of valve assembly 182. The hydraulic fluid 102 acts on an end of the valve spool 202 to move the valve spool 202 and compress biasing member 206 to place valve spool 202 in the second position or stroked position. A supply of pressurized hydraulic fluid is provided to the control device 174 via intermediate fluid line 142 when the clutch pressure control device 136 is energized or opened.

When the valve spool 202 is in the de-stroked position, the first inlet port 182A is in communication with the second outlet port 182D, the second inlet port 182B is in communication with the fourth outlet port 182F, and the first and third outlet ports 182C, 182E are in communication with the exhaust ports 182G. When the valve 202 is in the stroked position, as shown in FIG. 2B, the first inlet port 182A is in communication with the first outlet port 182C, the second inlet port 182B is in communication with the third outlet port 182E, and the second and fourth outlet ports 182D, 182F are in communication with the exhaust ports 182G. Accordingly, when the valve control device 174 is opened, pressurized hydraulic fluid 102 flows from the first pressure control device 140 and a variable flow of hydraulic fluid 102 flows from the first flow control device 178 to the second synchronizer actuator 186B. When the valve control device 174 is closed, pressurized hydraulic fluid 102 flows from the first pressure control device 140 and a variable flow of hydraulic fluid 102 flows from the first flow control device 178 to the first synchronizer actuator 186A.

The second actuator pressure control device 141 is preferably an electrically controlled variable force solenoid having an internal closed loop pressure control. Various makes, types, and models of solenoids may be employed with the present invention so long as the second actuator pressure control device 141 is operable to control the pressure of the hydraulic fluid 102. The second actuator pressure control device 141 includes an inlet port 141A that communicates with an outlet port 141B when the second actuator pressure control device 141 is activated or energized and includes an exhaust port 141C that communicates with the outlet port 141B when the second actuator pressure control device 141 is inactive or de-energized. Variable activation of the second actuator pressure control device 141 regulates or controls the pressure of the hydraulic fluid 102 as the hydraulic fluid 102 communicates from the inlet port 141A to the outlet port 141B. The internal closed loop pressure control provides pressure feedback within the solenoid to adjust the amount of flow to the outlet port 141B based on a particular current command from the controller 32, thereby controlling pressure. The inlet port 141A is in communication with the main supply line 126. The outlet port 141B is in communication with an intermediate line 210. The exhaust port 141C is in communication with the sump 104 or an exhaust backfill circuit (not shown).

The intermediate line 210 communicates pressurized hydraulic fluid 102 from the second actuator pressure control device 141 to the second flow control device 180 and the second valve assembly 184. The second flow control device 180 is preferably an electrically controlled variable force solenoid. Various makes, types, and models of solenoids may be employed with the present invention so long as the second flow control device 180 is operable to control the flow of the hydraulic fluid 102. The second flow control device 180 includes an inlet port 180A that communicates through an adjustable hydraulic orifice or restriction with an outlet port 180B when the second flow control device 180 is energized to a current above the null point current and includes an exhaust port 180C that communicates with the outlet port 180B when the second flow control device 180 is de-energized below the null point current. Variable activation of the second flow control device 180 regulates or controls the flow of the hydraulic fluid 102 as the hydraulic fluid 102 communicates from the inlet port 180A to the outlet port 180B. The inlet port 180A is in communication with the intermediate line 210. The outlet port 180B is in communication with an intermediate line 212 which communicates with the second valve assembly 184. The exhaust port 180C is in communication with the sump 104 or an exhaust backfill circuit (not shown).

The second valve assembly 184 is operable to selectively direct the pressurized hydraulic fluid 102 flows from the second pressure control device 141 and the second actuator flow control device 180 to the third synchronizer actuator 186C and to the fourth synchronizer actuator 186D, as will be described in greater detail below. The second valve assembly 184 includes a first inlet port 184A, a second inlet port 184B, a first outlet port 184C, a second outlet port 184D, a third outlet port 184E, a fourth outlet port 184F, a plurality of exhaust ports 184G, and a control port 184H. The first inlet port 184A is in communication with the intermediate line 212. The second inlet port 184B is in communication with the intermediate line 210. The first outlet port 184C is in communication with a synchronizer supply line 214. The second outlet port 184D is in communication with a synchronizer supply line 216. The third outlet port 184E is in communication with a synchronizer supply line 218. The fourth outlet port 184F is in communication with a synchronizer supply line 220. The exhaust ports 184G are in communication with the sump 104 or an exhaust backfill circuit (not shown). The control port 184H is in communication with the control line 200 that communicates with the control device 174.

The second valve assembly 184 further includes a valve spool 222 slidably disposed within a valve body or bore 224. The valve spool 222 is moveable between at least two positions by a biasing member 226 and by fluid flow channeled from the control device 174 via control line 200. The biasing member 226 is preferably a spring and acts on an end of the valve spool 222 to bias the valve spool 222 to the first position or de-stroked position. When the control device 174 is energized or activated a flow of the hydraulic fluid 102 is communicated to the control port 184H via control line 200 and into a control chamber 227 of valve assembly 184. The hydraulic fluid 102 acts on an end of the valve spool 222 to move the valve spool 222 and compress biasing member 226 to place valve spool 222 in the second position or stroked position. It should be appreciated that the valve control device 174 actuates both valve assemblies 182 and 184 when in the open condition via the control line 200.

When the valve 222 is in the de-stroked position, the first inlet port 184A is in communication with the second outlet port 184D, the second inlet port 184B is in communication with the fourth outlet port 184F, and the first and third outlet ports 184C, 184E are in communication with the exhaust ports 184G. When the valve 222 is in the stroked position, as shown in FIG. 2B, the first inlet port 184A is in communication with the first outlet port 184C, the second inlet port 184B is in communication with the third outlet port 184E, and the second and fourth outlet ports 184D, 184F are in communication with the exhaust ports 184G. Accordingly, when the valve control device 174 is opened, pressurized hydraulic fluid 102 flows from the second pressure control device 141 and a variable flow of hydraulic fluid 102 flows from the second flow control device 180 to the fourth synchronizer actuator 186D. When the valve control device 174 is closed, pressurized hydraulic fluid 102 flows from the second pressure control device 141 and a variable flow of hydraulic fluid 102 flows from the second flow control device 180 to the third synchronizer actuator 186C.

The synchronizer actuators 186A-D are preferably two-area piston assemblies operable to each engage or actuate a shift rail in a synchronizer assembly, but can be three-area piston assemblies without departing from the scope of the present invention. For example, the first synchronizer actuator 186A is operable to actuate the first synchronizer assembly 30A, the second synchronizer actuator 186B is operable to actuate the second synchronizer assembly 30B, the third synchronizer actuator 186C is operable to actuate the third synchronizer assembly 30C, and the fourth synchronizer actuator 186D is operable to actuate the fourth synchronizer assembly 30D.

The first synchronizer actuator 186A includes a piston 230A slidably disposed within a piston housing or cylinder 232A. A detent spring 231A biases the piston 230A in a first engaged position, a second engaged position and in a neutral position. The piston 230A presents two separate areas for pressurized hydraulic fluid to act upon. The piston 230A engages or contacts a finger lever, shift fork, or other shift rail component 233A of the first synchronizer assembly 30A. The first synchronizer actuator 186A includes a fluid port 234A that communicates with a first end 235A of the piston 230A and a fluid port 236A that communicates with an opposite second end 237A of the piston 230A having a smaller contact area than the first end 235A. Fluid port 234A is in communication with the synchronizer supply line 194 and fluid port 236A is in communication with the synchronizer supply line 198. Accordingly, the pressurized hydraulic fluid 102 communicated from the first actuator pressure control device 140 enters the first synchronizer actuator 186A through the fluid port 236A and contacts the second end 237A of the piston 230A and the flow of hydraulic fluid 102 from the first flow control device 178 enters the first synchronizer actuator 186A through the fluid port 234A and contacts the first end 235A of the piston 230A. The difference in the force generated by the pressure of the hydraulic fluid 102 delivered to fluid port 236A from the first actuator pressure control device 140 and the hydraulic fluid 102 delivered to fluid port 234A from the first flow control device 178 moves the piston 230A between various positions. By controlling the flow of hydraulic fluid 102 from the first flow control device 178, the piston 234A is actuated between the various positions. Each position in turn corresponds to a position of the shift rail of the first synchronizer assembly 30A (i.e., engaged left, engaged right, and neutral). A fork position sensor 240A may be included to communicate to the controller 32 the position of the shift fork 233A.

The second synchronizer actuator 186B includes a piston 230B slidably disposed within a piston housing or cylinder 232B. A detent spring 231B biases the piston 230B in a first engaged position, a second engaged position and in a neutral position. The piston 230B presents two separate areas for pressurized hydraulic fluid to act upon. The piston 230B engages or contacts a finger lever, shift fork, or other shift rail component 233B of the second synchronizer assembly 30B. The second synchronizer actuator 186B includes a fluid port 234B that communicates with a first end 235B of the piston 230B and a fluid port 236B that communicates with an opposite second end 237B of the piston 230B having a smaller contact area than the first end 235B. Fluid port 234B is in communication with the synchronizer supply line 192 and fluid port 236B is in communication with the synchronizer supply line 196. Accordingly, the pressurized hydraulic fluid 102 communicated from the first actuator pressure control device 140 enters the second synchronizer actuator 186B through the fluid port 236B and contacts the second end 237B of the piston 230B and the flow of hydraulic fluid 102 from the first flow control device 178 enters the second synchronizer actuator 186B through the fluid port 234B and contacts the first end 235B of the piston 230B. The difference in the force generated by the pressure of the hydraulic fluid 102 delivered to fluid port 236B from the first actuator pressure control device 140 and the hydraulic fluid 102 delivered to fluid port 234B from the first flow control device 178 moves the piston 230B between various positions. By controlling the flow of hydraulic fluid 102 from the first flow control device 178, the piston 234B is actuated between the various positions. Each position in turn corresponds to a position of the shift rail of the second synchronizer assembly 30B (i.e., engaged left, engaged right, and neutral). A fork position sensor 240B may be included to communicate to the controller 32 the position of the shift fork 233B.

The third synchronizer actuator 186C includes a piston 230C slidably disposed within a piston housing or cylinder 232C. A detent spring 231C biases the piston 230C in a first engaged position, a second engaged position and in a neutral position. The piston 230C presents two separate areas for pressurized hydraulic fluid to act upon. The piston 230C engages or contacts a finger lever, shift fork, or other shift rail component 233C of the third synchronizer assembly 30C. The third synchronizer actuator 186C includes a fluid port 234C that communicates with a first end 235C of the piston 230C and a fluid port 236C that communicates with an opposite second end 237C of the piston 230C having a smaller contact area than the first end 235C. Fluid port 234C is in communication with the synchronizer supply line 216 and fluid port 236C is in communication with the synchronizer supply line 220. Accordingly, the pressurized hydraulic fluid 102 communicated from the second actuator pressure control device 141 enters the third synchronizer actuator 186C through the fluid port 236C and contacts the second end 237C of the piston 230C and the flow of hydraulic fluid 102 from the second flow control device 180 enters the third synchronizer actuator 186C through the fluid port 234C and contacts the first end 235C of the piston 230C. The difference in the force generated by the pressure of the hydraulic fluid 102 delivered to fluid port 236C from the second actuator pressure control device 141 and the hydraulic fluid 102 delivered to fluid port 234C from the second flow control device 180 moves the piston 230C between various positions. By controlling the flow of hydraulic fluid 102 from the second flow control device 180, the piston 234C is actuated between the various positions. Each position in turn corresponds to a position of the shift rail of the third synchronizer assembly 30C (i.e., engaged left, engaged right, and neutral). A fork position sensor 240C may be included to communicate to the controller 32 the position of the shift fork 233C.

The fourth synchronizer actuator 186D includes a piston 230D slidably disposed within a piston housing or cylinder 232D. A detent spring 231D biases the piston 230D in a first engaged position, a second engaged position and in a neutral position. The piston 230D presents two separate areas for pressurized hydraulic fluid to act upon. The piston 230D engages or contacts a finger lever, shift fork, or other shift rail component 233D of the fourth synchronizer assembly 30D. The fourth synchronizer actuator 186D includes a fluid port 234D that communicates with a first end 235D of the piston 230D and a fluid port 236D that communicates with an opposite second end 237D of the piston 230D having a smaller contact area than the first end 235D. Fluid port 234D is in communication with the synchronizer supply line 214 and fluid port 236D is in communication with the synchronizer supply line 218. Accordingly, the pressurized hydraulic fluid 102 communicated from the second actuator pressure control device 141 enters the fourth synchronizer actuator 186D through the fluid port 236D and contacts the second end 237D of the piston 230D and the flow of hydraulic fluid 102 from the second flow control device 180 enters the fourth synchronizer actuator 186D through the fluid port 234D and contacts the first end 235D of the piston 230D. The difference in the force generated by the pressure of the hydraulic fluid 102 delivered to fluid port 236D from the second actuator pressure control device 141 and the hydraulic fluid 102 delivered to fluid port 234D from the second flow control device 180 moves the piston 230D between various positions. By controlling the flow of hydraulic fluid 102 from the second flow control device 180, the piston 234A is actuated between the various positions. Each position in turn corresponds to a position of the shift rail of the fourth synchronizer assembly 30D (i.e., engaged left, engaged right, and neutral). A fork position sensor 240D may be included to communicate to the controller 32 the position of the shift fork 233D.

During general operation of the hydraulic control system 100, the accumulator 130 provides the pressurized hydraulic fluid 102 throughout the system and the pump 106 is employed to charge the accumulator 130. Selection of a particular forward or reverse gear ratio is achieved by first selectively actuating one of the synchronizer assemblies 30A-D and then selectively actuating one of the torque transmitting devices 22, 24. It should be appreciated that the combination of selective engagement of the actuator assemblies 30A-D and torque transmitting devices 22, 24 providing a forward or reverse gear ratio may vary without departing from the scope of the present invention.

Generally, the first actuator pressure control device 140 selectively provides pressurized hydraulic fluid 102 to each of the synchronizer actuators 186A-B and the first flow control device 178 and the second actuator pressure control device 141 selectively provides pressurized hydraulic fluid 102 to each of the synchronizer actuators 186C-D and the second flow control device 180. Individual synchronizer actuators 186A-D are actuated by controlling a flow from one of the flow control devices 178 and 180 based upon positioning of the first and second valve assemblies 182 and 184.

For example, to actuate the first synchronizer assembly 30A, the first pressure control device 140 is energized to provide a pressure on the piston 230A and to provide a flow of pressurized hydraulic fluid 102 to the first flow control device 178. Bi-directional translation of the first synchronizer assembly 30A is then achieved by selectively energizing the first flow control device 178. To actuate the second synchronizer assembly 30B, the first pressure control device 140 is energized to provide a pressure force on the piston 230B and to provide a flow of pressurized hydraulic fluid 102 to the first flow control device 178. Bi-directional translation of the second synchronizer assembly 30B is then achieved by selectively energizing the first flow control device 178.

To actuate the third synchronizer assembly 30C, the second pressure control device 141 is energized to provide a pressure force on the piston 230C and to provide a flow of pressurized hydraulic fluid 102 to the second flow control device 180. Bi-directional translation of the third synchronizer assembly 30C is then achieved by selectively energizing the second flow control device 180.

To actuate the fourth synchronizer assembly 30D, the second pressure control device 141 is energized to provide a pressure force on the piston 230D and to provide a flow of pressurized hydraulic fluid 102 to the second flow control device 180. Bi-directional translation of the third synchronizer assembly 30D is then achieved by selectively energizing the second flow control device 180.

To engage or actuate the first torque transmitting device 22, the first clutch pressure control device 136 and the first clutch flow control device 144 are energized or opened. To engage or actuate the second torque transmitting device 24, the second clutch pressure control device 138 and the second clutch flow control device 160 are energized or opened.

Figure 3:
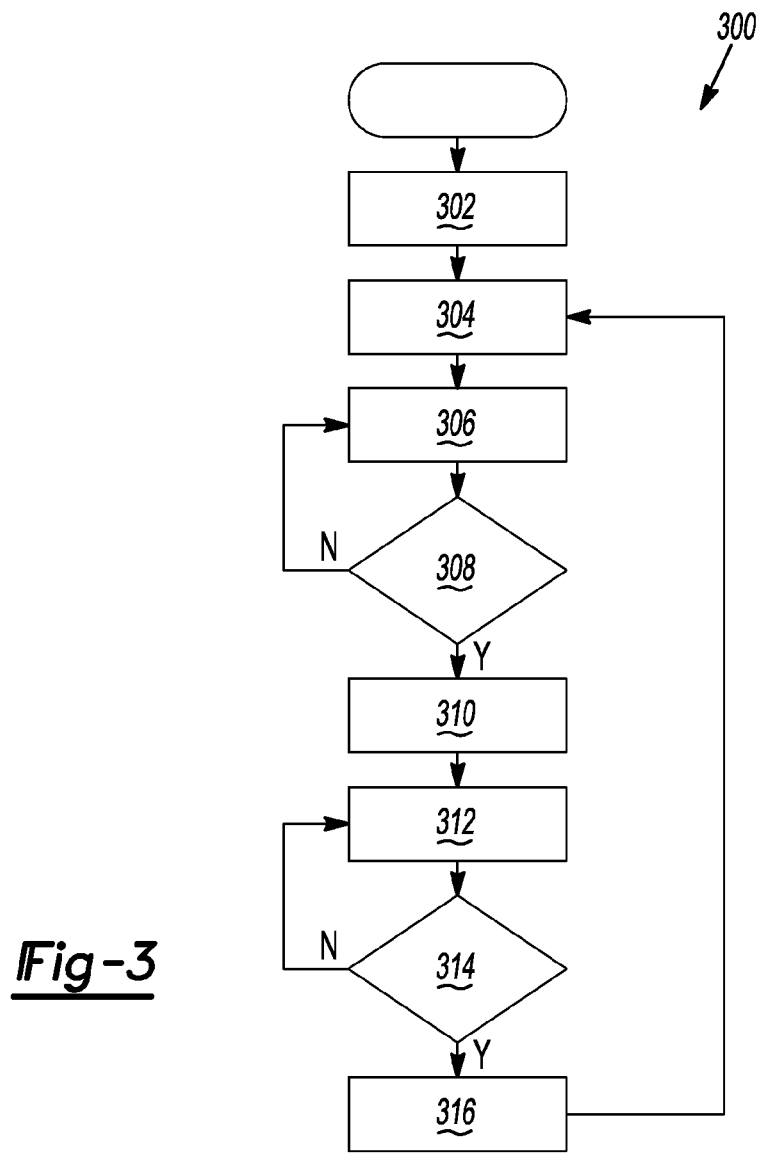
FIG. 3 is a flow chart illustrating a method of controlling a hydraulic fluid delivery subsystem within the hydraulic control system.

Turning to FIG. 3, a method for controlling the oil delivery subsystem 100A is generally indicated by reference number 300. Generally, the electrically-driven, fixed displacement pump 106 is used to provide pressurized hydraulic fluid 102 to be used to actuate the clutches 22, 24 and synchronizers 30A-D to make the transmission 10 shift. The hydraulic control system 100 provides this pressurized fluid 102 independent of whether the engine (not shown) is running, thereby keeping the clutches 22, 24 staged for quick response during engine start/stop maneuvers and other driving conditions. The pump 106 is turned on when the pressure sensor 132 indicates that the accumulator 130 needs recharged and is turned off when full charge pressure is achieved.

Prior to initial charging of the hydraulic control system 100, the accumulator 130 is depressurized. This provides no reserve hydraulic fluid 102 volume to be used by the transmission 10 for shifting. Therefore, the pressure sensor 132 sends a signal to the controller 32 to start the pump 106 at step 302. At step 304 the pump 106 accelerates to a fixed rpm and begins displacing hydraulic fluid 102 from the sump 104, out through the oil filter 118 and check ball 120, and into the accumulator 130 and the rest of the hydraulic control system 100. This hydraulic fluid 102 builds pressure and begins to charge the accumulator 130, indicated by line section 305 in FIG. 4. At step 306, the pressure sensor 132 senses the pressure of the hydraulic fluid 102 within fluid line 126 and therefore within the accumulator 130 and communicates the sensed pressure to the controller 32. At step 308 the sensed pressure is compared to a first threshold value. The first threshold value is a predetermined pressure value indicative of a fully charged accumulator 130, indicated by "P1" in the accumulator pressure versus time graph illustrated in FIG. 4. If the sensed pressure is less than the first threshold value the method 300 returns to step 306. If the sensed pressure is greater than or equal to the first threshold value, the method 300 proceeds to step 310 where the current to the pump 106 is terminated by the controller 32 thereby causing the pump 106 to stop spinning. At this point hydraulic fluid 102 wants to rush from the accumulator 130 back into the pump 106 but is prevented from doing so by the check ball 124 which seats and seals the pump 106 from the accumulator 130. With the check ball 124 seated, the only place for the hydraulic fluid 102 within the accumulator 130 to flow is to the rest of the subsystems 100B and 100C for clutch and synchronizer control.

Figure 4:
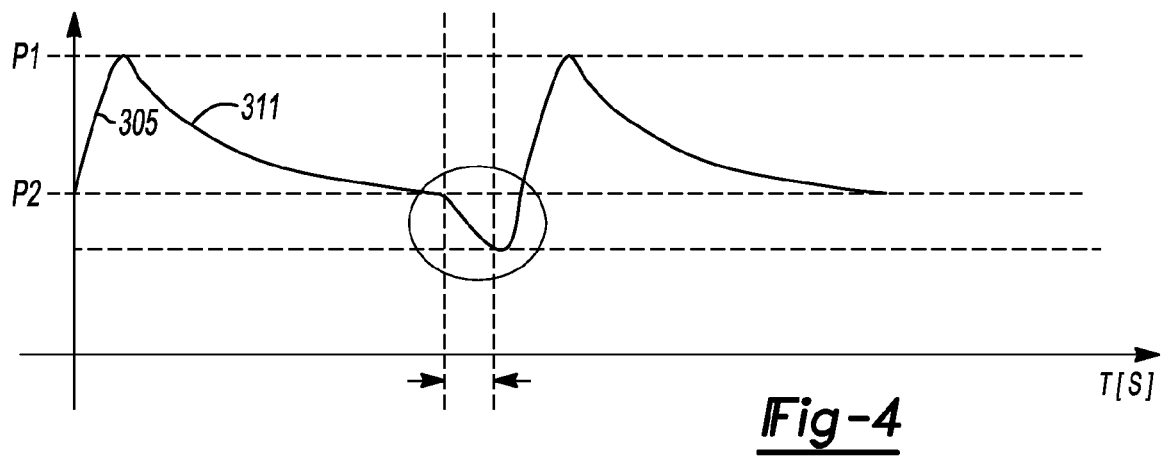
FIG. 4 is a chart illustrating accumulator pressure over time.

However, the leakage of subsystems 100B and 100C and hydraulic fluid 102 volume used to stroke actuators makes the pressure in the accumulator 130 decrease over time, indicated by the line section 311 in FIG. 4. At step 312 the pressure sensor 132 senses the pressure of the hydraulic fluid 102 within fluid line 126 and therefore within the accumulator 130 and communicates the sensed pressure to the controller 32. At step 314 the sensed pressure is compared to a second threshold value. The second threshold value is a calculated pressure value in the accumulator 130 that will guaranty sufficient accumulator reserve volume to accomplish a number of rapid shifting maneuvers. The second threshold pressure is indicated by "P2" in the accumulator pressure versus time graph illustrated in FIG. 4. The accumulator reserve volume is a function of the number of shifts, the component volumes stroked, the shift times, the rate of system leakage, and the rate of pump output of the transmission 10. The second threshold pressure is calculated as a function of temperature, gas charge pressure in the accumulator 130, pump 106 output flow capabilities, either learned or assumed leakage and stroke volumes to engage or neutralize forks and clutches. The second threshold pressure is determined by calculating the accumulator pressure level that will guaranty the accumulator reserve volume. Once the accumulator reserve volume is determined the pump restart pressure can be calculated according to gas law physics. If the sensed pressure is greater than or equal to the second threshold value the method 300 returns to step 312. If the sensed pressure is less than the second threshold value, the method 300 proceeds to step 316 where the current to the pump 106 is activated by the controller 32 thereby causing the pump 106 to restart. The method then returns to step 304 and the cycle continues, as shown in FIG. 4. The blow-off safety valve 116 is designed to unseat and limit the system pressure in the event that the pump 106 does not shut off at the right time either due to a failed pump motor, a failed pressure sensor, or sluggish response. The designed blow-off pressure is slightly above the maximum expected system pressure. For instance if the maximum system pressure is 60 bar, the blow-off will be designed so the nominal may be at 80 bar.

The pump 106 may also run at a fixed lower rpm to create a closed-loop pressure control during some failsafe operation modes where a failed clutch solenoid could result in over pressurization of the clutch 22 or 24. The pump 106 can be turned on during shifting events where relatively large amounts of hydraulic volume are extracted from the accumulator 130. The pump 106 can also be turned on prior to the driver starting the engine (not shown) to hydraulically charge the system 100 before any shifting or drive-away is requested. Pre-start of the pump 106 can be triggered by the opening of a door, unlocking of the car doors, or other means.

Figure 5:
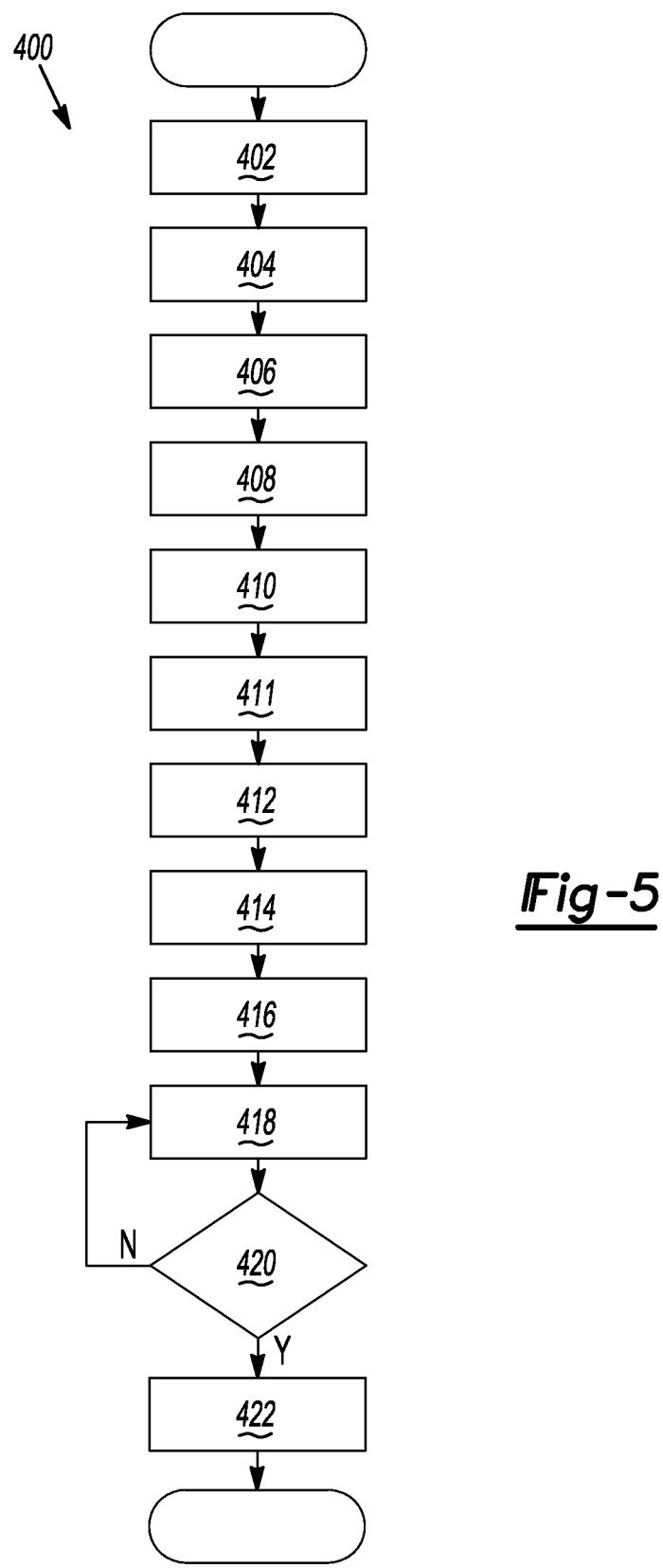
FIG. 5 is a flow chart illustrating a method of controlling a clutch actuator subsystem within the hydraulic control system.

Turning now to FIG. 5, a method for controlling the clutch control subsystem 100B is generally indicated by reference number 400. In this embodiment, the even and odd clutch circuits (i.e. the fluid lines and solenoids, and actuators that control the positions of the clutches 22, 24) are identical but independent. Accordingly, reference to both circuits will be made hereinafter in discussing the method 400. However, each circuits' flow rate and clutch position can be independently commanded based on the specific shifting or staging needs of that clutch. The method 400 begins at step 402 where the controller 32 determines a target clutch torque for one of the clutches 22, 24. The target clutch torque is an amount of torque required to perform an action within the transmission 10, such as a shift event or maintaining a gear ratio. At step 404 the controller 32 uses a clutch torque to clutch actuator 152, 168 position relationship to determine a target clutch position that will provide the target clutch torque. The clutch torque to clutch actuator 152, 168 position relationship is learned as the transmission 10 is operating by relating the reported engine torque while the clutches 22, 24 are slipping to the position of the pistons 154, 170 reported by the clutch position sensors 157 and 167. This relationship, once learned, is used to provide a feed-forward control command while shifting. Closed-loop control is also used to fine tune the relationship between the clutch torque to clutch actuator 152, 168 position relationship.

At step 406 the controller 32 calculates a commanded pressure level of the pressure control solenoid 136, 138 that is selected to control the selected clutch 22, 24. The commanded pressure level of the selected pressure control solenoid 136, 138 is calculated from the higher of three pressure requirements: the first pressure requirement is the pressure level required to enable the required amount of flow through the flow control solenoids 160 and 144; the second is the pressure level required to hold the target clutch torque on the selected clutch 22, 24; and the third is the pressure level required to shift the mode valves 182 and 184. In some cases a pressure drop required across flow control devises 144 & 160 results in a pressure higher than the pressure required for clutch torque capacity. Once the commanded pressure level is calculated, the method proceeds to step 408 where the controller 32 sends a current to the selected pressure control solenoid 136, 138 to provide the commanded pressure level. The selected pressure control solenoid 136, 138 has a performance characteristic that relates regulated pressure to commanded electrical current. Once the commanded pressure level is determined, the appropriate amount of current can be commanded to the selected pressure control solenoid 136, 138. The commanded pressure level establishes an upstream side of a pressure potential across the selected flow control solenoid 144, 160 that is in communication with the selected pressure control solenoid 136, 138. The commanded pressure level for selected pressure control solenoids 136 and 138, feeds a three way check valve assembly 147, in order to feed mode valve control solenoid 174. The higher pressure output, pressure control solenoid 136 or 138 toggles over the three way check ball to cut off feed from the lower pressure control solenoid 136 or 138. The higher pressure oil from pressure control solenoid 136 or 138 then feeds through the three way check valve 147 to the mode valve control solenoid 174. At step 410 the clutch position sensors 157, 167 sense the position of the pistons 154, 170 of the clutch actuators 152, 168 and communicates the current position of the pistons 154, 170 to the controller 32. At step 411, the controller 32 determines a current sent to flow control devises 144 & 160 to achieve the targeted clutch position determined in step 404. At step 412 the controller 32 uses a predetermined clutch actuator 152, 168 position to clutch pressure relationship to estimate a current clutch pressure. At step 414 the controller 32 calculates the pressure potential across the selected flow control solenoid 144, 160. The pressure potential across the selected flow control solenoid 144, 160 is calculated by subtracting the current clutch pressure from the commanded pressure level of the selected pressure control solenoid 136, 138 (i.e. the upstream pressure potential minus the downstream pressure potential).

Once the pressure potential across the selected flow control solenoid 144, 160 has been determined, at step 416 the controller 32 determines, based on the pressure potential across the selected flow control solenoid 144, 160, whether to exhaust, maintain, or provide add pressure to hold a pressure drop across flow control solenoids 144 & 160 to provide predictable flow rates to position the selected clutch 22, 24 to the target clutch position determined in step 404 in order to provide the target clutch torque. The pressure potential supplied across the selected flow control solenoid 144, 160 creates a relationship between an electrical current and a flow rate from the selected flow control solenoid 144, 160. As described above, the flow control solenoids 144, 160 are capable of both positive (feed) flow, zero flow, and negative (exhaust) flow depending on the value of current commanded. At step 418 the controller 32 commands the proper current on the flow control devices 144, 160 that will bring the current clutch position to the target clutch position. Closed loop control may also be used based on actual and commanded piston 154, 170 velocity and position to control the flow control solenoids 144, 160 At step 420, closed loop control is used by the controller 32 based on actual and commanded piston 180, 200 velocity and position to control the flow control solenoids 160, 162. If the current position of the piston 180, 200 does not equal the commanded position of the piston 180,200, the method 400 returns to step 418. If the current position of the piston 180, 200 does equal the commanded position of the piston 180,200, the method 400 proceeds to step 422 where the controller 32 stops the commanded current to the flow control devices 160, 162. If the clutches 22, 24 are being engaged, flow is positive and larger currents are commanded. If the clutches 22, 24 are being disengaged, flow is negative and lower currents are commanded. There is a region of current in the middle where the flow is deadheaded, neither feeding nor exhausting. Steps 402 through 418 are continuously processing to ensure that clutches 22 & 24 are in their proper position.

The spring loaded check balls 146, 162 may be provided to allow quick releases of the clutches 22, 24 or to release the clutches 22, 24 in the event of a flow control solenoid 144, 160 sticking in the deadheaded region. The clutches 22, 24 are released through the check balls 146, 162 by reducing the pressure control solenoids 136, 138 pressure below the clutch pressure level and check ball threshold. The pressure and flow rate to each clutch 22, 24 can be independently controlled based on the specific shifting or staging needs of the clutches 22, 24.

Figure 6:
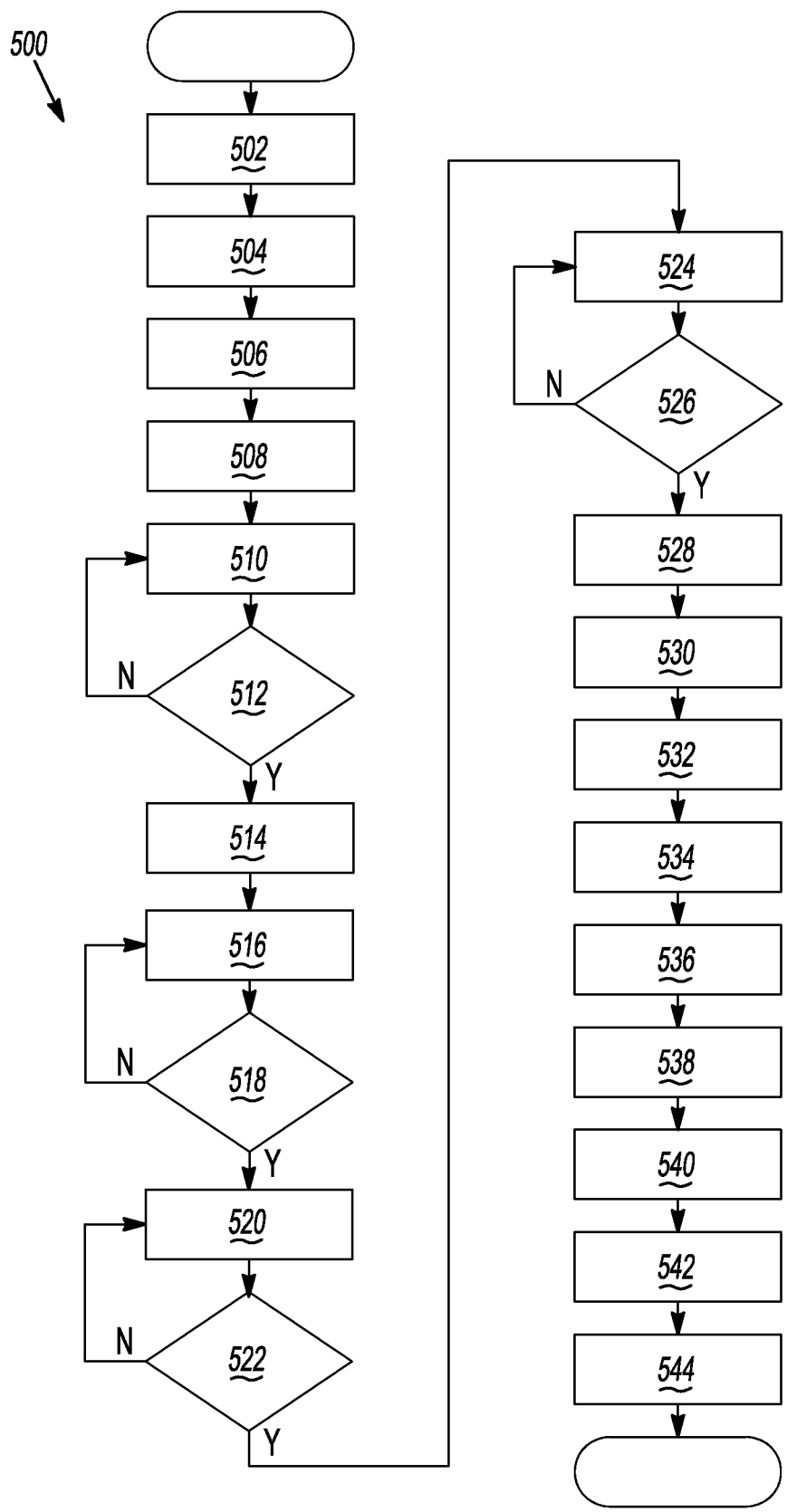
FIG. 6 is a flow chart illustrating a method of controlling a synchronizer actuator subsystem within the hydraulic control system.

Turning now to FIG. 6, the method of controlling the synchronizer control subsystem 100C is generally indicated by reference number 500. The synchronizer control subsystem 100C consists of two duplicated hydraulic circuits to control the odd and even gear synchronizers, respectively. One circuit consists of one of the pressure control solenoids 140, 141, one of the flow control solenoids 178, 180, one of the mode valves 182, 184, the shared mode valve solenoid 174, and two of the actuators 186A-D. One circuit may control the 1st, 3rd, 5th, and 7th gear synchronizers, for example. The other circuit may control the 2nd, 4th, 6th, and Reverse gear synchronizers, for example. Each fork actuator 233A-D is dual-acting meaning that it has a fully-engaged position to the left, a neutral position in the middle, and a fully engaged position to the right. For example, one actuator piston could engage the 3rd gear synchronizer to the left and the 5th gear synchronizer to the right with a neutral position in the middle.

The method 500 begins at step 502 where the controller 32 selects a synchronizer 30A-D to be engaged in order to meet the shifting requirements of the motor vehicle. The method 500 applies to any selected synchronizer 30A-D, therefore reference to both of the odd and even circuits will hereinafter be used. The synchronizers 30A-D operate in different modes, shown in FIG. 7. The synchronizer modes consist of two steady-state modes and at least three transient modes. The steady-state modes include a fully engaged mode 501 and a neutralized mode or pre-staging 503. Transient modes consist of a pre-synchronized mode 505, a synchronizing mode 507, and post-synchronized mode 509. Moreover, line "A" in FIG. 7 indicates the relative synchronizer force over time, line "B" indicates the actual synchronizer position over time, and line "C" indicates the fork position command over time.

Prior to any synchronizer shifting event, the mode valves must be positioned to connect the pressure and flow control solenoids 140, 141 and 178, 180, respectively, to the actuator 186A-D that controls the selected synchronizer 30A-D. Accordingly, the method 500 proceeds to step 504 where the controller 32 sends an appropriate electric current command to the mode valve solenoid 174. If the current command is high, the solenoid 174 will impart a pressure within the signal chambers 191 and 227 at the head of the valves 202 and 222 of both mode valves 182 and 184. This pressure is sufficient to move the valves 202 and 222 against the bias springs 206 and 226, respectively. This will connect the odd branch pressure control solenoid and the flow control solenoid, for example, to the 3rd and 5th gear actuator piston and the even branch pressure control solenoid and flow control solenoid, for example, to the 2nd and 6th gear actuator piston. If the current command is low, the mode valve solenoid 174 will exhaust the signal chambers 191 and 227 at the head of the valves 202 and 222. This causes the bias springs 206 and 226 to push the valves 202 and 222, respectively, to their de-energized or de-stroked positions. This will connect the odd branch pressure control solenoid and the flow control solenoid, for example, to the 1st and 7th gear actuator piston and the even branch pressure control solenoid and the flow control solenoid, for example, to the 4th and Reverse gear actuator piston. Actual pairings of mode valve states, actuator pistons, and gear pairings per actuator 186A-D may vary without departing from the scope of the present invention.

As noted above, the actuator pistons 230A-D have two opposing areas 235A-D and 237A-D of different size. The larger area is connected to the output of one of the flow control solenoids 178, 180. The smaller area is connected to one of the pressure control solenoid 140, 141 outputs. If one of the pistons 237A-D is desired to move to the right, the connected pressure control solenoid 140, 141 is commanded to a pressure level and the connected flow control solenoid 178, 180 is commanded to a position where the connected flow control solenoid 178, 180 will feed the hydraulic fluid 102 from the connected pressure control solenoid 140, 141 to the larger area of the actuator piston 230A-D. Pressure builds up in the larger area, and eventually an equilibrium force is reached. Beyond this equilibrium force the piston 230A-D will begin to move to the right against the detent spring load and pressure control solenoid pressure force generated on the smaller opposing area. If the actuator 230A-D is desired to move to the left, the connected pressure control solenoid 140, 141 is commanded to a pressure level and the connected flow control solenoid 178, 180 is commanded to a position where the connected flow control solenoid 178, 180 will exhaust the hydraulic fluid 102 in the larger area of the actuator piston 230A-D. As pressure drops in the larger area, eventually an equilibrium force is reached. Beyond this equilibrium force the piston 230A-D will begin to move to the left due to the detent spring 231A-D load and the connected pressure control solenoid 140, 141 pressure force generated on the smaller opposing area.

Figure 7:
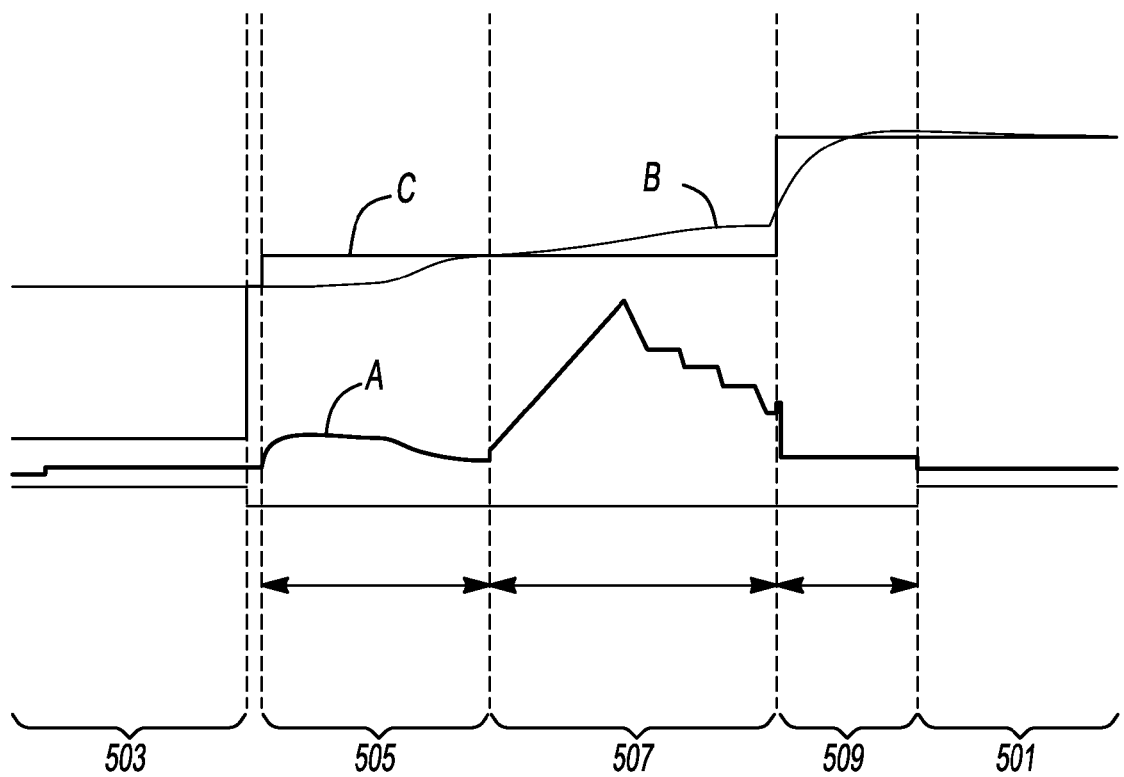
FIG. 7 is a chart illustrating synchronizer controls over time.

Once the mode valve assemblies 182 and 184 have been pre-staged, as shown at 503 in FIG. 7, the method 500 proceeds to step 506 where the controller 32 commands the pressure control solenoid 140, 141 to a predetermined pressure level. This step begins the pre-sync mode 505. The pre-sync mode 505 consists of moving the actuator piston 230A-D and fork 233A-D until the synchronizer sleeve (not shown) contacts the blocker ring (not shown) in the synchronizer 30A-D. The predetermined pressure level is a pressure of the hydraulic fluid 102 sufficient to provide a flow rate required to move the actuator piston to the commanded position in the desired amount of time and to overcome the detent spring and piston drag. At step 508 the flow control solenoid 178, 180 is commanded to open to either feed or exhaust the larger area volume, depending on the desired direction of movement of the synchronizer 30A-D. These commands to the pressure control solenoids 140, 141 and the flow control solenoids 178, 180 are adjusted as dictated by closed-loop position control using piston position and velocity feedback from the position sensor at step 510.

At step 512 the controller determines whether the piston 230A-D is approaching the learned position at which synchronization will begin. If the piston 230A-D is not nearing the learned position, the method returns to step 510. If the piston 230A-D is approaching the learned position, the method proceeds to step 514 where the pressure from the pressure control solenoid 140, 141 is reduced in order to slow the velocity of the piston 230A-D. Slowing the velocity of the piston 230A-D avoids a bump or clunk when synchronizer contact is made.

At step 516 the beginning of the synchronization mode 507 is signaled based on piston position and shaft speed feedback from the speed sensors (not shown). Next, the flow control solenoid 178, 180 flow rate commanded in or out is increased to reduce restriction in the circuit. This allows the controlling force on the piston 230A-D to be only a function of the pressure control solenoid 140, 141. The actuator force through the synchronization mode 507 is ramped to provide a smooth speed change across the synchronizer without any clunks or bumps through using pressure control solenoids 140 & 141. If the desired synchronization force is to the right, the flow control solenoid 178, 180 opens up to feed the actuator 186A-D. Accordingly, the pressure on both sides of the piston 230A-D is equalized, but since the larger area provides a larger force than the smaller area, there is a net force to the right. If the desired synchronization force is to the left, the flow control solenoid 178, 180 opens up to exhaust. This drops the pressure on the large side of the piston, but since the smaller area is still pressurized, there is a net force to the left.

At step 518 the controller 32 determines whether the synchronization mode 507 is nearing the end. If the synchronization mode 507 is not nearing the end, the method returns to step 516. If the synchronization mode 507 is nearing the end, pressure provided by the pressure control solenoid 140, 141 is lowered at step 520 in anticipation of the post-sync mode 509.

At step 522 the controller 32 determines whether the post-sync mode 509 has been signaled. The post-sync mode 509 begins when the blocker ring (not shown) indexes and allows the sleeve (not shown) of the synchronizer 30A-D to move through to full engagement with the gear 26. If the post-sync mode 509 has not been signaled, the method 500 returns to step 520. If the post-sync mode 509 has been signaled, the method proceeds to step 524 where the velocity of the fork actuator 233A-D is controlled to avoid a clunk when the sleeve (not shown) contacts and stops on the gear 26. The velocity of the fork actuator 233A-D is controlled with closed-loop position and velocity control wherein a pressure level is set with the pressure control solenoid 140, 141 and the flow control solenoid 178, 180 is opened to either feed or exhaust to control the velocity of the piston 230A-D.

At step 526 the controller 32 determines whether the full engagement mode 501 has been signaled. The full engagement mode 501 begins when the sleeve (not shown) contacts and stops on the gear 26. If the full engagement mode 501 has not been signaled, the method 500 returns to step 524. If the full engagement mode 501 has been signaled, the method proceeds to step 528 where the pressure control solenoid 140, 141 pressure is profiled to zero pressure as active control of the flow control solenoid 174, 180 is maintained. This guarantees that the fork 233A-D remains in full engagement. Once the full engagement mode 501 is complete the mode valve solenoid 174 pressure is reduced to zero at step 530 in order to conserve leakage at the head of the mode valves 202 and 226. Back taper on the synchronizer teeth (not shown) and the detent spring force hold the synchronizer 30A-D in full engagement.

When disengaging the synchronizer 30A-D from full engagement mode back to neutral mode 503, there is only a position and velocity controlled phase. At step 532 the mode valve solenoid 174 is commanded to the appropriate state to couple the pairs of pressure control solenoids 140, 141 and flow control solenoids 178, 180 to the appropriate actuator 186A-D. At step 534 the flow control solenoid 178, 180 is opened either to feed or exhaust depending on the direction of the intended motion. The pressure control solenoid 140, 141 is commanded to a pressure level required to generate the commanded flow across the flow control solenoid 178, 180. Next, the flow control solenoid 178, 180 is commanded to flow oil into or out of the large area chamber at step 536, forcing the piston 230A-D to move. The position and velocity of the actuator piston 230A-D is controlled via closed-loop control using the feedback of the position sensor 233A-D at step 538. As the fork 233A-D approaches the middle neutral position, the commanded velocity is slowed at step 540. Once the piston 230A-D has reached a region near the learned neutral position, the pressure control solenoid 140, 141 is profiled off while still actively controlling the flow control solenoid 178, 180 at step 542. Once the pressure is exhausted on the actuator 230A-D, a mechanical detent spring (not shown) holds the actuator 230A-D in the neutral position. The mode valve solenoid 174 is then commanded to zero pressure to conserve leakage at the head of the mode valves at step 544, and full disengagement is complete.

The components of the hydraulic control subsystem 100 are connected via a plurality of fluid communication lines, as described above. It should be appreciated that the fluid communication lines may be integrated in a valve body or formed from separate tubing or piping without departing from the scope of the present invention. In addition, the fluid communication lines may have any cross sectional shape and may include additional or fewer bends, turns, and branches than illustrated without departing from the scope of the present invention. The valve assembly described above is illustrated as spool valve assembly having multiple ports. However, it should be appreciated that other specific types of valves having greater or fewer ports may be provided without departing from the scope of the present invention. Finally, it should be appreciated that the source of pressurized hydraulic fluid, i.e. the pump accumulator 130 and the electrically driven pump 106 may be replaced by alternate hydraulic fluid sources, such as an engine driven pump.

By providing flow control of the clutches 22 and 24 and/or the synchronizer assemblies 30A-D, the hydraulic control system 100 is operable to provide direct clutch position control, direct synchronizer actuator position control, and variable clutch and synchronizer actuator position control. At the same time, quick clutch response times are enabled, spin losses are reduced, and packaging space of the hydraulic control system 100 is reduced, all of which contributes to improved fuel economy and performance. The hydraulic control system 100 is also compatible with BAS/BAS+ hybrid systems. Finally, failure mode protection is enabled through pre-staged position control of the control devices 136, 138, 140, 141, 144, 160, 178, 180, and the valves 182 and 184.

The description of the invention is merely exemplary in nature and variations that do not depart from the general essence of the invention are intended to be within the scope of the invention. Such variations are not to be regarded as a departure from the spirit and scope of the invention.

The invention claimed is:

1. A method of controlling a dual clutch and a plurality of synchronizers in a transmission, the method comprising:
   selecting a synchronizer from the plurality of synchronizers and a clutch from the dual clutch to be actuated in order to achieve a desired speed ratio in the transmission;
   selecting a commanded pressure level for a clutch pressure control solenoid in upstream fluid communication with the selected clutch from the higher of a pressure level required to enable a required amount of flow through a clutch flow control solenoid in downstream fluid communication with the pressure control solenoid, a pressure level required to hold a clutch torque on the selected clutch, and a pressure level required to position a mode valve from a first position and a second position;
   commanding the clutch pressure control solenoid to provide a first supply of hydraulic fluid at the selected commanded pressure level;
   commanding the clutch flow control solenoid to provide a flow rate of the first supply of hydraulic fluid that will actuate the selected clutch;
   commanding a synchronizer pressure control solenoid to provide a second supply of hydraulic fluid to a synchronizer flow control solenoid and to a first input of the mode valve;

commanding the synchronizer flow control solenoid to provide a third supply of hydraulic fluid to a second input of the mode valve;

actuating the mode valve to one of the first and second positions to connect the first input with a first output and the second input with a second output, wherein the first output is connected to a first portion of a chamber of a actuator and the second output is connected to a second portion of the chamber of the actuator; and modulating the second supply of hydraulic fluid from the synchronizer pressure control solenoid and the third supply of hydraulic fluid from the synchronizer flow control solenoid to move the actuator to a at least one of a first and second position to engage the selected synchronizer.

2. The method of claim 1 wherein the step of positioning the mode valve includes commanding a valve control solenoid in downstream fluid communication with the clutch pressure control solenoid to provide a third supply of hydraulic fluid to the mode valve.

3. A method for controlling a dual clutch in a transmission, the dual clutch having a clutch actuatable by a clutch actuator, the clutch actuator in downstream fluid communication with a flow control solenoid that is in downstream fluid communication with a pressure control solenoid, the method comprising:

determining a target clutch torque to be provided by the clutch;

determining a target clutch position of the clutch that will provide the target clutch torque using a clutch torque to clutch actuator position relationship;

selecting a first pressure of a hydraulic fluid to be provided by the pressure control solenoid from the higher of a pressure required to enable a required amount of flow through the flow control solenoid to actuate the clutch, a pressure required to hold the target clutch torque on the clutch, and a pressure required to shift a mode valve;

commanding the pressure control solenoid to provide a first supply of hydraulic fluid at the selected first pressure to establish an upstream side of a pressure potential across the flow control solenoid;

sensing a position of the clutch actuator;

estimating a second pressure of a second supply of hydraulic fluid at the clutch actuator using a predetermined clutch actuator position to clutch pressure relationship;

calculating a pressure potential across the flow control solenoid by subtracting the second pressure from the first pressure, wherein the pressure potential across the flow control solenoid creates a relationship between a control signal and a flow rate from the flow control solenoid;

determining a flow rate of the first supply of hydraulic fluid to be provided by the flow control solenoid that will position the clutch actuator to the target clutch position;

determining a control signal to be sent to the flow control solenoid to provide the flow rate of the first supply of hydraulic fluid; and communicating the control signal to the flow control solenoid to move the clutch actuator to the target clutch position to provide the target clutch torque.

4. The method of claim 3 further comprising the step of maintaining the pressure potential across the flow control solenoid by commanding the pressure control solenoid to exhaust, maintain, or provide added pressure to the flow control solenoid.

5. The method of claim 3 wherein the target clutch torque is an amount of torque required to perform an action within the transmission including performing a shift event or maintaining a gear ratio.

6. The method of claim 3 wherein the clutch torque to clutch actuator position relationship is learned as the transmission is operating by relating a engine torque while the clutch is slipping to a position of the clutch actuator.

7. The method of claim 3 further comprising the step of adjusting the clutch torque to clutch actuator position relationship using closed-loop position control.

8. The method of claim 3 wherein step of sensing the clutch actuator position includes sensing the clutch actuator position using a clutch position sensor.

9. A method synchronizing a speed of a shaft to a gear in a transmission of a motor vehicle, the method comprising:

monitoring a position of an actuator configured to move a synchronizer coupled to the shaft;

monitoring a speed of the shaft;

positioning a mode valve to connect a pressure control solenoid and a flow control solenoid with the actuator;

determining an initial position of the synchronizer based on the monitored position of the actuator;

commanding the pressure control solenoid to provide a first supply of hydraulic fluid at a first predetermined pressure to the actuator and the flow control solenoid;

commanding the flow control solenoid to either feed a second supply of hydraulic fluid at a first flow rate to the actuator or to exhaust hydraulic fluid from the actuator at the first flow rate depending on a desired direction of movement of the synchronizer in order to move the synchronizer from the initial position to a first position;

determining whether the synchronizer has reached the first position based on the monitored position of the actuator;

reducing the pressure of the first supply of hydraulic fluid from the pressure control solenoid to a second predetermined pressure level when the synchronizer is moving between the first position and a second position in order to reduce a speed of the actuator;

determining whether the synchronizer has reached the second position based on the monitored position of the actuator and the monitored speed of the shaft;

commanding the flow control solenoid to either feed or exhaust the actuator at a second flow rate that is less than the first flow rate when the actuator has reached the second position;

increasing the pressure of the first supply of hydraulic fluid from the pressure control solenoid to a third predetermined pressure level when the synchronizer has reached the second position to move the actuator to a third position;

determining whether the synchronizer has reached the third position based on the monitored position of the actuator;

reducing the pressure of the first supply of hydraulic fluid from the pressure control solenoid to a fourth predetermined pressure level when the synchronizer is moving between the third position and a fourth position to reduce a speed of the actuator;

determining whether the synchronizer has reached the fourth position based on the monitored position of the actuator;

reducing the pressure of the first supply of hydraulic fluid from the pressure control solenoid to a fifth predetermined pressure level and commanding the flow control solenoid to either feed or exhaust the actuator at a third flow rate when the synchronizer is moving between the fourth position and a fifth position;

determining whether the synchronizer has reached the fifth position based on the monitored position of the actuator; and commanding the pressure control solenoid to zero pressure when the synchronizer is at the fifth position.

10. The method of claim 9 wherein the first, second, third, fourth, and fifth predetermined pressure levels are each a pressure sufficient to provide a flow rate required to move the actuator to the commanded position in a desired amount of time and to overcome a detent spring and actuator drag.

11. The method of claim 9 wherein the second position is the position of the synchronizer wherein a synchronizer sleeve contacts a blocker ring.

12. The method of claim 11 wherein the fourth position is a position wherein the blocker ring indexes with the gear and the synchronizer sleeve engages the gear.

13. The method of claim 12 wherein the fifth position is the position of the synchronizer wherein the synchronizer couples the shaft to the gear.

14. The method of claim 13 wherein the first position is disposed between the initial position and the first position.

15. The method of claim 14 wherein the third position is disposed between the second position and the fourth position.

16. The method of claim 9 wherein the step of positioning the mode valve includes commanding a pressure on a mode valve control solenoid, wherein the commanded pressure is sufficient to move the mode valve and wherein movement of the mode valve connects the pressure control solenoid and the flow control solenoid to the actuator of the synchronizer.

17. The method of claim 9 wherein the commands on the flow control solenoid and the pressure control solenoid are adjusted using actuator position and velocity feedback.

* * * * *